Aug. 6, 1935.  A. HERMAN  2,010,394
FASTENING AND CONNECTION FOR GLASS PLATES
Filed Feb. 12, 1934  4 Sheets-Sheet 1
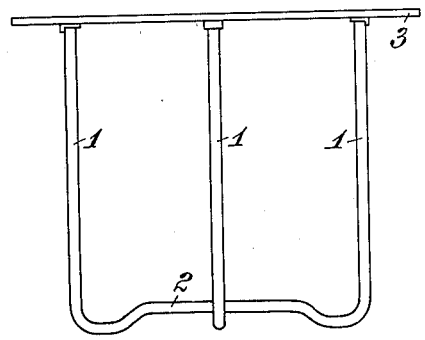
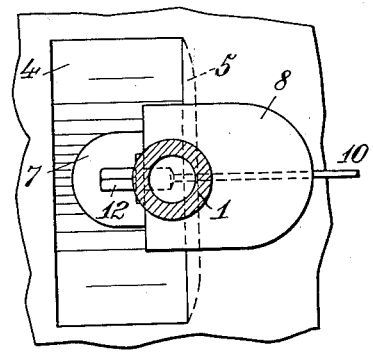
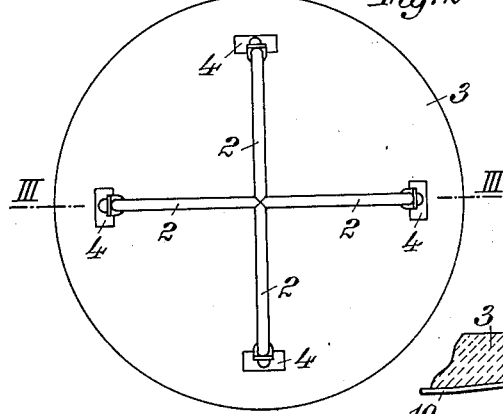
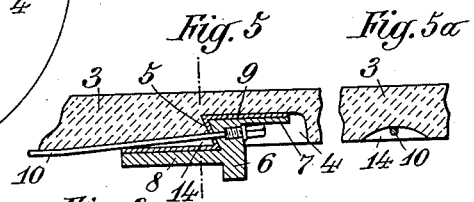
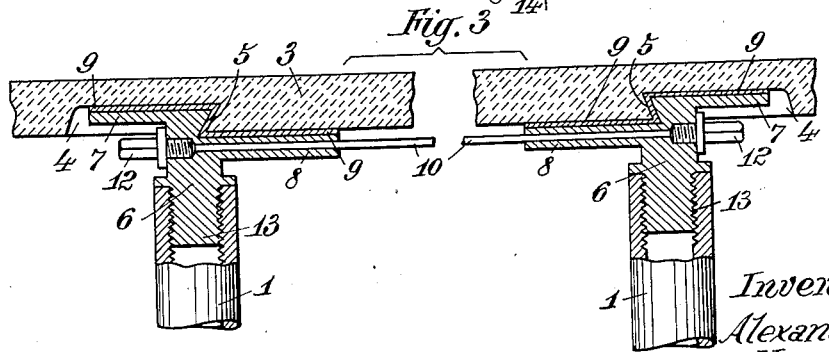
Inventor:
Alexander Herman
Attorneys:
Bailey & Larson

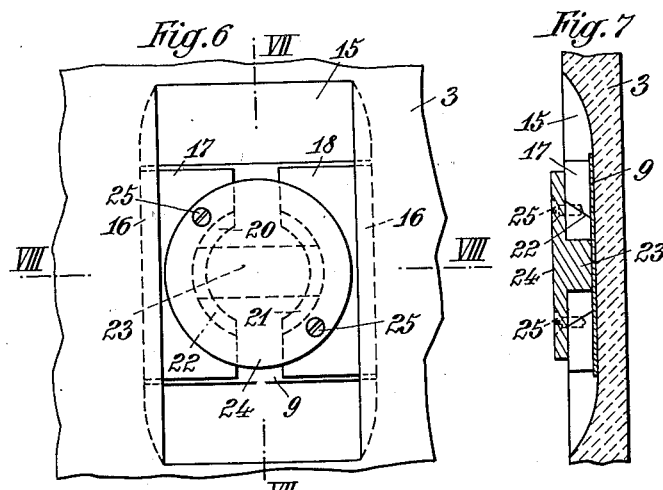
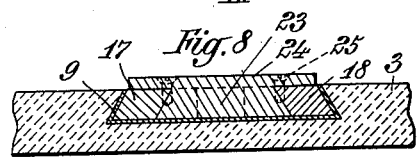
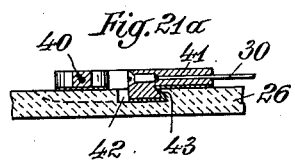
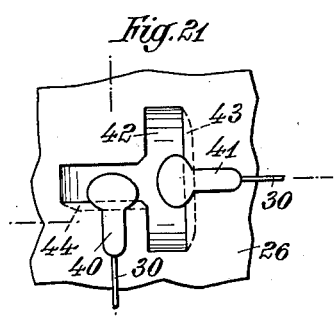
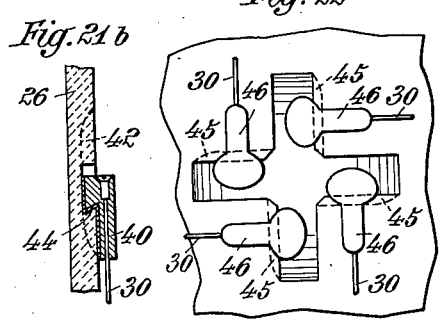

Aug. 6, 1935.  A. HERMAN  2,010,394
FASTENING AND CONNECTION FOR GLASS PLATES
Filed Feb. 12, 1934   4 Sheets-Sheet 3
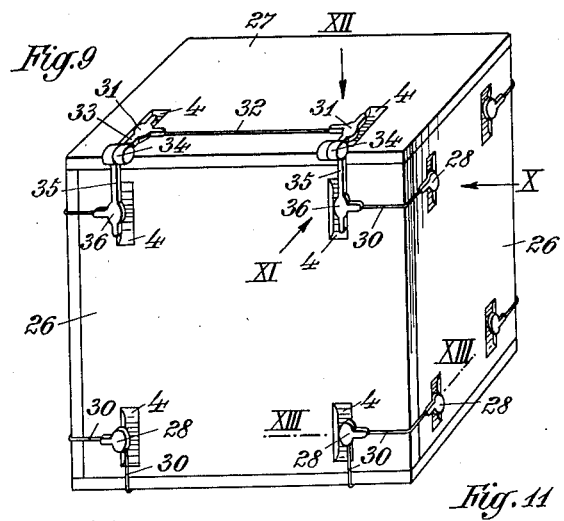
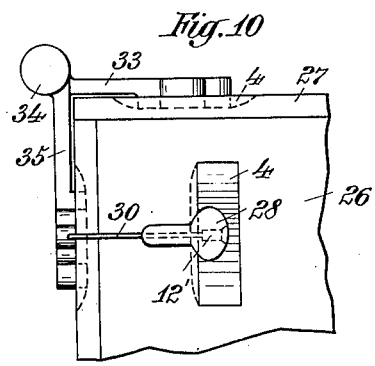
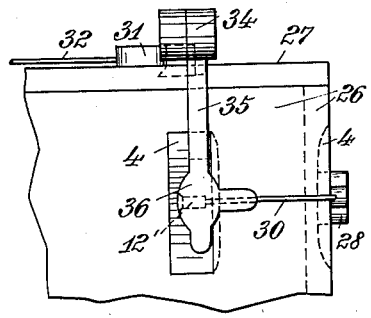
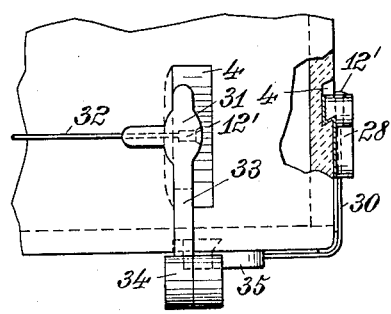
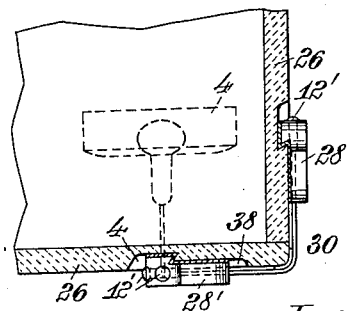
Inventor:
Alexander Herman
Attorneys:
Bailey & Larson Aug. 6, 1935.    A. HERMAN    2,010,394
FASTENING AND CONNECTION FOR GLASS PLATES
Filed Feb. 12, 1934    4 Sheets-Sheet 4
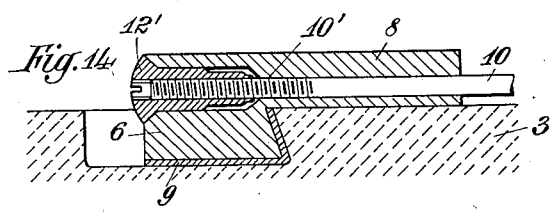
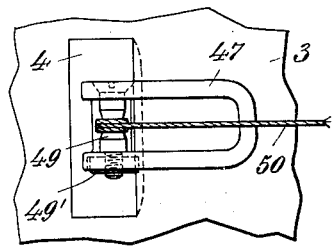 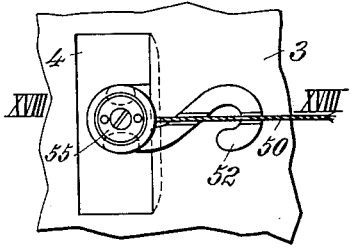
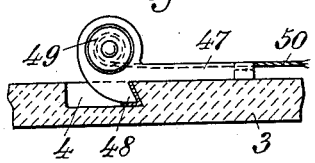 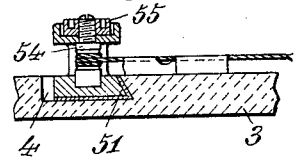
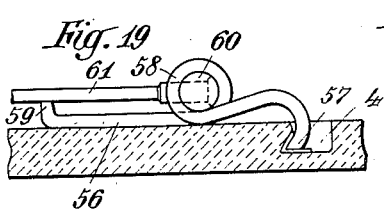 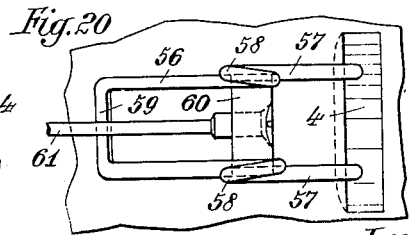
Inventor:
Alexander Herman
Attorneys
Bailey & Larson Patented Aug. 6, 1935

2,010,394

UNITED STATES PATENT OFFICE 2,010,394

FASTENING AND CONNECTION FOR GLASS PLATES

Alexander Herman, Berlin, Germany

Application February 12, 1934, Serial No. 710,972
In Germany October 16, 1931

8 Claims. (Cl. 312—140)

This invention relates to a new detachable fastening and connection for glass plates.

As glass is very sensitive to certain strains, it is quite difficult to connect glass plates, particularly those of large dimensions and great thickness, with one another or to secure them to supports, such as frames and the like. If the plates are pierced for attaching fastening or connecting screws, the glass will break as soon as the screws are slightly overtightened. Furthermore, the use of these fastening or connecting means involves the loss of a perfectly smooth surface which is often desirable.

The employment of other means for joining two parts, which are known and used in other fields, has hitherto always been rejected by those skilled in the art with respect to glass plates, since they did not appear to be promising in view of the peculiarity of glass.

Thorough experiments have shown, however, that it is nevertheless possible to produce immovable connections for glass plates, which will withstand great stresses and yet be easily detachable, without being compelled to pierce or tap the plates.

According to the invention, this can be done by providing the glass plates to be secured to a support or to one another with clearances in the form of local depressions, the undercut walls of which are engaged by separate clamps interconnected by adjustable parts, preferably in the form of elastic tension members, and thus pressed against the walls of the clearances.

As experiments have proved, it thus becomes possible to produce immovable connections, which will withstand great stresses and yet be readily detachable, and to prevent breaking of the glass plates even if the clamps are firmly pressed against the walls of the clearances.

The invention permits also the reliable connection of large and heavy glass plates with supports of any kind or with one another so as to produce objects of different shape.

The invention further affords the advantage of simple and cheap production.

Further details and uses of the connection according to the invention will be disclosed below in the description of the embodiments illustrated in the accompanying drawings, in which Figure 1 is a front view of a table having metal legs and a glass top; Fig 2, an inverted plan view of Fig. 1; Fig. 3, a longitudinal section on an enlarged scale on the line III—III, of Fig. 2; Fig. 4, a view of a fastening point seen from below; Fig. 5, a section of another form of fastening means; Fig. 5a, a section on the line V—V, of Fig. 5; Fig. 6, a top view of another embodiment of the invention with several clamp parts engaging a common clearance; Fig. 7, a section on the line VII—VII, of Fig. 6; Fig. 8, a section on the line VIII—VIII, of Fig. 6; Figs. 9 to 22 show different constructional embodiments of the invention for interconnecting glass plates, Fig. 9 being a perspective view of a show-case consisting of several glass plates; Fig. 10 being a detail view on a larger scale of one corner of the case according to Fig. 9 as seen in the direction of the arrow X; Fig. 11 showing another corner of the case according to Fig. 9 in the direction of the arrow XI; Fig. 12 showing still another corner of the case according to Fig. 9 in the direction of the arrow XII; Fig. 13 is a section on the line XIII—XIII, of Fig. 9; Fig. 14, a section of a clamp, showing on a larger scale one form of clamping device; Fig. 15, a top view of a clamp, showing another form of clamping device; Fig. 16, a side view of the device shown in Fig. 15; Fig. 17, a top view of still another form of clamping device and clamp; Fig. 18, a section on the line XVIII—XVIII, of Fig. 17; Figs. 19 and 20 are, respectively, a longitudinal section and a top view of another form of clamp; Figs. 21, 21a and 21b are, respectively, a top view and two sections of an embodiment showing a clearance with two clamps; and Fig. 22 shows a further form of such constructions.

Referring to the drawings, the table according to Figs. 1 and 2 comprises four metal tubes 1 in crosswise arrangement, which are bent below to form the transverse struts 2 constituting the base. 3 is the glass plate to be connected with the table frame and provided for this purpose with the clearances or recesses 4 which are arranged in pairs opposite to one another, as shown in Figs. 2 and 3.

The recesses 4 can be produced in various ways. They may be completely cast in or pressed in when the plates are made, though exhaustive experiments have shown that it is particularly advantageous subsequently to provide the recesses by grinding them out of the finished glass plate.

The recesses may have different forms, depending on the use for which the plates are intended. A recess may for instance be shaped like a shell or trough and have a straight or curved bottom surface.

In the constructions shown it is assumed that the recess is produced by an ordinary grinding wheel and thus acquires a form shown in Fig. 4, which corresponds to that of the grinding wheel.

Each recess has at least one undercut wall 5, and the slopes of two opposite recesses extend in opposite directions, as indicated in Fig. 3.

The recesses 4 are engaged by the make-up pieces or clamps 6 comprising a flat rounded portion 7, a sloping surface corresponding to the undercut wall 5 of the recesses 4, and a rounded flat projection 8.

The clamps 6 are inserted in the recess, so that the portion 7 lies on the bottom thereof, and then laterally displaced until their sloping face abuts against the sloping wall 5 of the recesses 4. In this position the projection 8, with its side facing the glass plate 3, will hug the latter and prevent tilting.

At all points where the clamp 6 contacts with the glass plate 3 a thin layer 9 of a yielding material, e. g., rubber, is loosely interposed or connected with the glass plate or the clamp by pasting or in any other suitable manner.

Of the clamps 6 inserted in the recesses 4 of the glass plates 3, two are always joined together by a connecting means 10 which in the constructions shown in Figs. 1 to 5 is a wire provided on both ends with the turnbuckles 12 which are threaded and engage bores of the clamps 6. Other means or arrangements may be provided for connecting the clamps 6, as indicated in Fig. 14, where both ends of the connecting wire 10 are formed with screw threads 10' engaged by nut-forming sleeves 12' each rotatable in the respective clamp 6. Other constructional forms will be described in connection with Figs. 15 to 18.

It is further possible to reverse the direction of the application pressure, that is, to move the inserted pieces apart instead of drawing them together in order to fasten them to the glass plates. In this case, the sloping faces of the recess 4 in Fig. 3 would be on the outside thereof and rigid connecting means would be required.

The inserted pieces or clamps 6 serve as carriers for the fastening means proper which may be differently arranged and constructed.

In the construction according to Fig. 3 each clamp 6 is assumed to possess a threaded pin 13 directly engaging a counter-thread on the legs 1.

It is, however, possible to connect with the clamps or inserted pieces 6 special intermediate members which are then suitably fastened to the frame.

In order to bring the point of application of the tensional forces into the glass plate 3 or at least near the edges thereof, the projection 8 of the clamp 6 may have a perforation through which the connecting wire 10 passes which will then be very close to the underside of the plate 3.

For the same purpose, the projection 8 in Fig. 3 is pierced and the connecting wire 10 passes through this bore.

As Figs. 5 and 5a show, the glass plate 3 may have a ground groove 14 which increases in depth towards the recess 4. In this groove 14 the connecting wire 10 is embedded, and the clamping screw 12 acts farther up and is located inside the recess 4.

As to the number of recesses and their distribution over the glass plate various possibilities exist. For example, instead of the crosswise arrangement shown in Fig. 2, two cooperating recesses may be disposed at a distance from and parallel to one another in the longitudinal or transverse direction of the plate.

In case of very large glass plates several pairs of cooperating clamps may be arranged one behind the other to distribute the stresses as uniformly as possible over the entire plate.

In some instances, where supports of special character are concerned, it may be advisable to have the fastening means engage only at one point, which can be effected by imparting a particularly compact construction to the parts required for securing the glass plate to its support. In such cases several clamp portions are inserted in a common recess having undercut walls, and are then interconnected by a locking member. The recess may for instance be circular in shape and engaged by three or more clamp portions of circular form which are connected by a threaded center portion and thus at the same time locked relative to the clearance.

In the construction shown in Figs. 6 to 8 the glass plate 3 has a recess 15 having substantially the form of a dovetailed groove with slightly curved bottom. The undercut longitudinal walls 16 of this recess 15 support two correspondingly shaped chucks 17, 18 having circular cavities 20, 21 and slopes 22, which are engaged by a wedge-shaped member 23, comprising a covering plate 24 and being integral therewith, in the manner of a bayonet catch.

Assembly is effected as follows:

The two parts 17, 18 are placed in the position shown in Fig. 6. Then the wedge member 23 with the plate 24 is introduced from above and turned so that the ends of the wedge contact with the slopings 22 of the cavities 20, 21, so that the two chucks 17, 18 are spread apart and clamped against the undercut walls 16 of the recess 15. In locking position, as shown in Fig. 6, the plate 24 can be held by two screws 25.

The connection according to the invention affords special advantages when cases of the kind used for the display of objects of all sorts are to be produced.

Fig. 9 shows such a case comprising five glass plates 26 and a plate 27 serving as cover.

The connection of the glass plates consists of two separate clamps 28 which, as described, possess projections engaging trough-shaped recesses 4 of the individual plates.

Two clamps each of a connection are connected by a means of any desired length, such as a wire 30, which holds the projections of the clamps against the undercut walls of the recesses 4 by means of the turnbuckles 12'.

As Fig. 9 indicates, two clamping devices on each side suffice for keeping the edges of the glass plates together.

The cover 27 is secured by means of the clamping device according to the invention in the following manner:

Two clamps 31 engage two recesses 4 in the cover 27, and the projections of these clamps, as stated before, are pressed against the undercut walls of the recesses by a wire 32. The clamps 31 possess arms 33 terminating in a hinge 34 to which the arms 35 of two other clamps 36 are rotatably attached. These clamps 36 are pressed again together with a clamp 28 against the walls of two correspondingly arranged recesses 4 by the wire 30.

As shown in Fig. 13, clamps engaged by wires with differently directed tensional forces may be specially secured against displacements within the recess 4. This can be done by providing a second recess 38 of low depth extending vertically to the recess 4, in which the projection 28' of the clamp 28 is embedded.

For the same purpose serve the arrangements shown in Figs. 21 and 22. Here the clamp 28 and the two wires 30 engaging it and working in different directions are replaced by two clamps 40, 41 inserted in a T-shaped recess 42 so that the clamp 40 abuts against the backed off wall 44 and the clamp 41 against the wall 43 of the same recess extending vertically to the wall 44.

In the modification according to Fig. 22, two recesses are ground into the glass plate at suitable points, said recesses intersecting, as shown in Fig. 22. This results in four radiating notches, the walls of which are undercut at the points intended to be engaged by the tensioning clamps. The undercut walls are designated at 45 in Fig. 22.

Four separate tensioning clamps 46 engage these walls, the tensioning wires extending in four different directions and terminating in tensioning clamps which similarly engage the recesses at another part of the same glass plate or of another plate.

It is thus apparent that such a cruciform recess may be provided substantially in the middle of the glass plate forming a wall of the casing, in the glass casing shown in Fig. 9. A tensioning wire then extends vertically upwards over the upper abutting edge to the cover of the casing; another extends vertically downwardly over the lower abutting edge to the bottom plate; and wires extend to the right and left, respectively, to the corresponding tensioning clamps in the two connecting side walls.

In this construction as well as in similar ones the four clamps may be integral, and still other arrangements are possible which require no description. It may merely be mentioned in this connection that two clamping devices working in different directions may engage a single recess whose opposite walls are provided with oppositely directed slopings.

Figs. 15 to 20 show various modified forms of clamps and connecting means.

The connecting means for two or more clamps may consist of wire, wire rope and other suitable material, including flexible material, such as catgut, cords and the like.

Figs. 15 to 18 show clamps specially suited for elastic connecting means.

The clamp shown in Fig. 15 consists of a bow-shaped part 47 reaching over the glass plate 3 and integral with the projection 48 engaging the recess 4. In two extensions of the bow 47 a small roll or drum 49 is disposed on which the elastic connecting means 50 is wound up during tensioning. When the drum 49 has been rotated by a suitable tool to obtain the proper tension, it is secured in position by suitable means, such as a nut 49'.

In the construction according to Fig. 17 the clamp 51 engaging the recess 4 has a projection 52 overlapping the glass plate, the projection 52 being bent in S-shape and perforated at two points to allow the elastic tensioning means 50 to pass.

The clamping device is disposed vertically to the glass plate and consists of a roll 54 rotatably disposed in the top part of the clamp, on which the tensioning means is wound up when the roll 54 is rotated by a suitable tool. After suitable tension has been attained the roll 54 is held in adjusted position by suitable means such as the nut 55.

In the construction according to Figs. 19 and 20 the clamp consists of a wire strap 56 whose two sides 57 are bent to form hooks at their front ends and which, approximately in their centers, form loops 58 and terminate in a web 59. The loops 58 carry a roll 60 which is engaged by the connecting means 61.

The upwardly bent web 59 lies underneath the clamping wire 61, and the wire bow 56 is thus always held in the position shown in Fig. 19.

It is evident that the invention may be modified in various ways without, however, deviating from the spirit thereof.

I claim:—

1. The combination with a glass plate structure formed with spaced recesses, each recess having an undercut wall, of separate clamps each engaging an undercut wall of a recess, a connection between said clamps, effective to hold said clamps in engagement with said recess, and means for varying the effective length of said connection.

2. The combination claimed in claim 1, in which the recesses are each of generally rectangular form and provided with a curved bottom face.

3. The combination claimed in claim 1 in which the connection between the clamps is under tension.

4. The combination claimed in claim 1 in which the connection between the clamps includes a flexible tension member.

5. The combination claimed in claim 1 in which the clamps are formed with projections adapted to bear on the surface of the plate, said projections having passages therein for the connection between the clamps.

6. A glass plate structure comprising abutting glass plates formed with recesses having undercut walls, clamps having projections engaging the recesses of said abutting plates and bearing on said undercut walls, and devices under tension for connecting said clamps and maintaining said projections in engagement with the undercut walls of said recesses.

7. A glass plate structure as claimed in claim 6 having a recessed cover, the clamps which engage recesses in one side wall of said structure being constructed as hinge elements connected to clamps also constructed as hinge elements and engaging recesses in said cover.

8. A glass plate structure as claimed in claim 6 in which a plurality of clamps at corner positions of the structure engage a common recess having a plurality of undercut walls.

ALEXANDER HERMAN.